(12) United States Patent
Bissantz

(10) Patent No.: US 10,528,646 B2
(45) Date of Patent: Jan. 7, 2020

(54) SYSTEM COMPRISING PROVIDING MEANS FOR PROVIDING NUMBERS TO A USER

(71) Applicant: Nicolas Bissantz, Nürnberg (DE)

(72) Inventor: Nicolas Bissantz, Nürnberg (DE)

( * ) Notice: Subject to any disclaimer, the term of this patent is extended or adjusted under 35 U.S.C. 154(b) by 0 days.

(21) Appl. No.: 15/386,530

(22) Filed: Dec. 21, 2016

(65) Prior Publication Data
US 2018/0173678 A1    Jun. 21, 2018

(51) Int. Cl.
G06F 17/21    (2006.01)
G09G 5/26    (2006.01)
G06T 11/00    (2006.01)
G06F 17/24    (2006.01)

(52) U.S. Cl.
CPC .......... G06F 17/212 (2013.01); G06F 17/245 (2013.01); G06T 11/001 (2013.01); G09G 5/26 (2013.01); *G09G 2340/045* (2013.01); *G09G 2340/14* (2013.01); *G09G 2354/00* (2013.01)

(58) Field of Classification Search
CPC ............. G06F 17/30324; G06F 17/211; G06F 17/212; G06F 17/245; G06F 17/246; B41J 2/17546; G06T 11/001; G09G 2340/045; G09G 2340/14; G09G 2354/00; G09G 5/26
See application file for complete search history.

(56) References Cited

U.S. PATENT DOCUMENTS

| 2006/0211494 A1* | 9/2006 | Helfer | G07F 17/3211 463/30 |
| 2008/0215347 A1* | 9/2008 | Suzuki | G06F 3/04817 705/1.1 |
| 2013/0293553 A1* | 11/2013 | Burr | G06F 17/11 345/440 |
| 2013/0342561 A1* | 12/2013 | Cardno | G06T 11/206 345/592 |

(Continued)

OTHER PUBLICATIONS

Heddings, Using Conditional Cell Formatting in Excel 2007, posted on Aug. 18, 2008, obtained from https://www.howtogeek.com/howto/microsoft-office/using-conditional-cell-formatting-in-excel-2007/ on Feb. 13, 2018, 7 pages.*

(Continued)

*Primary Examiner* — Haixia Du
(74) *Attorney, Agent, or Firm* — Dilworth & Barrese, LLP

(57) ABSTRACT

The present invention is directed to a system comprising providing means for providing numbers to user, comprising display means for displaying said provided numbers, each number having a value, wherein the system furthermore comprises determination means which is adapted to calculate the size of the number dependent on said value and/or wherein the determination means is adapted to calculate the depth of the color of the number or the depth of the color of background of the number dependent on said value, wherein the determination means is further adapted to elect the size of the number the larger the larger the value of the number (Continued)

2 4 6

2 4 6 7

2 4 6 7

2 4 6 7₁

2 4 6 7₁ 300 is and/or to elect the depth of the color the larger the larger the value of the number is, and wherein the display means is adapted to display the number in the determined size and/or to display the color in the determined depth.

2 Claims, 13 Drawing Sheets
(12 of 13 Drawing Sheet(s) Filed in Color)

(56) References Cited

U.S. PATENT DOCUMENTS

| | | | |
|---|---|---|---|
| 2014/0244340 A1* | 8/2014 | Singh | G06Q 30/00 705/7.25 |
| 2016/0070858 A1* | 3/2016 | Mankovich | G06F 19/26 702/19 |
| 2018/0064989 A1* | 3/2018 | Ikeda | A61B 5/11 |

OTHER PUBLICATIONS

Kaufman, How to Set Row Height and Column Width in Excel, posted on Sep. 8, 2016, obtained from https://www.howtogeek.com/270296/how-to-set-row-height-and-column-width-in-excel/ on Feb. 13, 2018, 9 pages.*

* cited by examiner

Figure 1

| turnover | Jan 2013 | Feb 2013 | Mar 2013 | Apr 2013 | May 2013 | Jun 2013 | Jul 2013 | Aug 2013 | Sep 2013 | Okt 2013 | Nov 2013 | Dec 2013 |
|---|---|---|---|---|---|---|---|---|---|---|---|---|
| luxury edition | 2' | 3' | 2' | 1' | 2' | 2' | 1' | 2' | 2' | 2' | 2' | 1' |
| special edition | 11' | 12' | 14' | 13' | 13' | 13' | 11' | 12' | 11' | 13' | 12' | 16' |
| swivel chairs | 4' | 4' | 5' | 4' | 4' | 4' | 4' | 4' | 3' | 4' | 3' | 5' |
| Alpha | 2' | 2' | 1' | 1' | 1' | 1' | 1' | 1' | 1' | 1' | 1' | 3' |
| Press | 2' | 2' | 2' | 2' | 2' | 2' | 2' | 2' | 2' | 2' | 2' | 1' |
| Ergo | 1' | 343 | 1' | 909 | 917 | 989 | 793 | 1' | 755 | 753 | 857 | 449 |
| visitor chairs | 6' | 7' | 9' | 9' | 9' | 9' | 7' | 8' | 7' | 9' | 9' | 11' |
| standard edition | 1' | 1' | 2' | 2' | 1' | 1' | 1' | 2' | 2' | 2' | 2' | 2' |

Figure 2

| | P1 | P2 | P3 | P4 | P5 | P6 | P7 | P8 |
|---|---|---|---|---|---|---|---|---|
| K1 | 257' | 168' | 29' | 149' | | 20' | | |
| K2 | 234' | 325' | 181' | 82' | 49' | 67' | | 66' |
| K3 | 36' | | | | | | | |
| K4 | 386' | 528' | 485' | 243' | 205' | 58' | 144' | 55' |
| K5 | 28' | | | | | | | |

Figure 3

| | P1 | P2 | P3 | P4 | P5 | P6 | P7 | P8 |
|---|---|---|---|---|---|---|---|---|
| K1 | 257' | 168' | 28' | 149' | 14' | 20' | 9' | 11' |
| K2 | 234' | 325' | 181' | 82' | 49' | 67' | 2' | 66' |
| K3 | 36' | 14' | 10' | 13' | 4' | 3' | | 3' |
| K4 | 386' | 528' | 485' | 243' | 205' | 58' | 144' | 55' |
| K5 | 28' | 14' | 6' | 4' | 2' | 2' | 1' | 1' |

Figure 4

| 257' | 168' | 28' | 149' | 14' | 20' | 11' |
| --- | --- | --- | --- | --- | --- | --- |
| 234' | 325' | 181' | 82' | 49' | 67' | 66' |
| 36' | | 14' | 10' | 13' | 4' | 3' |
| 386' | 528' | 485' | 243' | 205' | 58' | 55' |
| | | | | | 144' | |
| 28' | | 14' | 6' | 4' | 2' | 1' |
| | | | | | 2' | 1' |
| | | | | | 2' | |

Figure 5

| 257' | 168' | 28' | 149' | 14' | 20' | 9' | 11' |
| 234' | 325' | 181' | 82' | t49' | 67' | 2' | 66' |
| 36' | | 14' | 10' | 13' | 4' | 3' | 3' |
| 386' | 528' | 485' | 243' | 205' | 58' | 144' | 55' |
| 28' | | 14' | 6' | 4' | 2' | 2' | 1' |
| | | | | 2' | 1' | 1' | |

SYSTEM COMPRISING PROVIDING MEANS FOR PROVIDING NUMBERS TO A USER

BACKGROUND OF THE INVENTION

The present invention relates to a system comprising providing means for providing numbers to a user.

From the prior art it is known to present a large number of data on a display of a computer such as economical data, technical data etc. The data may be arranged in a table comprising a number of columns as well as a number of lines.

Frequently such tables or any other arrays of data contain a large amount of numbers having different values as well as a lot of information related to different aspects of the numbers so that it might be difficult to maintain an overview and to make a quick assessment of the numbers.

SUMMARY OF THE INVENTION

It is therefore an object of the present invention to provide a system comprising providing means for displaying numbers which remarkably increases the possibility to quickly assess the numbers or at least some of them even if a high number of data is shown on the display.

This object is solved by a system according to the description herein.

The present invention is directed to a system comprising providing means for providing numbers to user. The providing means may be a processor and may be adapted to provide numbers from a database, such as a server etc. to a display.

Usually at least some of the numbers have different values. For example the numbers represent turnover numbers, profits, losses etc. for different products.

The system according to the present invention further comprises display means for displaying said provided numbers, each number having a value. The display means may be a computer monitor or a display of a mobile device.

The system furthermore comprises determination means which is adapted to calculate the size of the number dependent on said value and/or which is adapted to calculate the depth of the color of the number and/or the depth of the color of the background of the number dependent on said value. Accordingly, the size in which the number is displayed and/or the depth of the color in which the number and/or its background is displayed are determined based on the value of the number.

Furthermore, the determination means is further adapted to elect the size of the number the larger the larger the value of the number is and/or to elect the depth of the color the larger the larger the value of the number is. This allows the user of the system to immediately assess the value of the number and thus its relevance since high numbers are displayed in a prominent manner due to their size and/or due to the depth of the color in which the number itself or the background on which the number is located is displayed.

Furthermore, the display means is adapted to display the number in the determined size and/or to display the color in the determined depth.

In accordance with a preferred embodiment of the invention the determination means is adapted to determine the size and/or the color based on a linear function from the value of the number. In other words the size of the displayed number and/or the depth of the color are correlated with the value of the number by a linear function, such as $y=a\ x+t$, wherein y is the size and/or depth of the color and x is the value of the number and t, a are fixed values which might be given by the system or elected by a user.

The determination means may be adapted to determine the largest value and/or the smallest value of said numbers and to allocate a determined size and/or color depth to said largest and/or smallest value. If for example the largest value is 15 and the smallest value is 3, the determination means may be adapted for example to allocate the size 20 pt to the number with value 15 and/or for example may allocate the size 5 pt to the number with value 3. The same applies alternatively or in addition to the depth of the color.

According to a further embodiment of the invention, the determination means is adapted to determine the largest value and the smallest value of said numbers and to allocate a first size and/or a first color depth to the largest value and to allocate a second size and/or a second color depth to the smallest value. In this case, both the largest value and the smallest value are assigned with a certain size or depth of the color according to the value.

In this case, the determination means may be adapted to determine the interval between the second determined size and/or color depth and the first determined size and/or color depth and to determine all sizes and/or color depths within this interval on a linear basis. Referring to the above example, the interval between the largest size and the smallest size is 20 pt−5 pt=15 pt, wherein the size 5 pt is assigned to the smallest value (which in this example is 3) and wherein the size 20 pt is assigned to the largest value (which in this example is 20). The size of all further numbers having a value between 3 and 20 is calculated by means of a linear function. This may be done for example by using the equation $y=a*x+t$, wherein y is the size and/or depth of the color and x is the value of the number. The term a is the gradient of the linear equation which may be determined by using the term 15 pt/(20−3)=15 pt/17=0.8824 pt/1. The parameter t is obtained by using a pair of a size and a value, such as value 3 and size 5 pt, so that the equation is 5 pt=0.8824 pt/1*3+t, thus t=2.353.

In this particular example, the final linear equation is therefore $y=0.8824$ pt/1*x+2.353.

Instead of using a linear correlation between the size and the value or between the color depth and the value any other non-linear correlation may be used.

The system my further comprise changing means which are adapted to amend the determination means, so that the determination means calculates the size and/or the color by means of another function and/or so that the determination means calculates other sizes and/or other colors. In that case the user has the option to change the determination means. Referring back to the above example, the user may make the amendment that the smallest value is assigned the size 10 pt and the largest value is assigned the size 40 pt etc.

Furthermore, the changing means may be adapted to work without the intervention by a user. If for example, the numbers are located in or near a text, the size which is allocated to the smallest value may correspond to the size of the letters of the text.

Preferably, the numbers are located in a table.

According to a further preferred embodiment, the size of the columns and/or the size of the lines of the table are variable. These sizes may be changeable by a user or automatically by the system.

According to one example of the invention the size of the columns and/or the size of the lines of the table are adapted to the number having the biggest size. In one embodiment the height of a line of the table and/or the width of a column of the table corresponds or is only a little (a certain percentage or a certain absolute value) larger than the height and/or width of the largest number.

In accordance with a further embodiment the color of the numbers or the color of the background is identical for all numbers. For example, all numbers may be displayed on background having the same color, for example white. In that case the depth of the color of the numbers might vary according to their value. According to another example, all numbers may be displayed in the same (for example in white) color and the depth of the color of the background is varied according the value of the number.

Further, according to another embodiment of the invention, the numbers are embedded within a text or a located near a text and the determination means are adapted to elect the size of the characters of the text as the size of the number having the smallest value. If the letters of the text are displayed for example in 12 pt this size may be assigned to the smallest number. In other words, no number will have a size smaller than 12 pt.

According to a further embodiment the numbers are displayed with units, such as "m" or "Mio" for Millions and "bn" or "Mrd" for billions. Preferably the system comprises means to detect the value of the numbers and to assign the appropriate unit to the numbers automatically. The applies generally and is not restricted to the units which are mentioned here.

Preferably, the same applies for other abbreviations which represent the magnitude of the numbers. For example the numbers may be added with "'" representing thousands, "''" representing millions, "'''" representing billions and so on.

Preferably, the system comprises input means which allow the user to input one or more numbers. The input means may be for example a keyboard or a touch screen.

In accordance with a preferred embodiment of the invention, the calculating means are adapted to recalculate the size of all displayed numbers depending of the value of the number which has been inputted at last. Accordingly, the display is dynamic insofar as the size of the displayed numbers changes in dependency of the number which has been added at last. If for example the range of sizes for all displayed numbers is between 10 pt and 40 pt and the set of displayed numbers ranges from 2 to 7, the size 10 pt may be assigned to the number 2 and the size 40 pt may be assigned to the number 7. If the user now enters the number 100, the size 40 pt is assigned to the newly added number 100 and all or at least some of the other number are decreased in size, such as in this example the size of number 7 which is decreased.

When new numbers are added it is preferred that the total range of size (such as from 10 pt to 40 pt) is not fully used. Otherwise, if for example the number 1 is already displayed and number 2 is added the difference in size of these two numbers would be too large.

Preferably, the range of sizes which is used for displaying the numbers in iteratively increased with an increasing amount of numbers or different numbers which are to displayed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Further advantages of the invention are demonstrated in the embodiment according to FIGS. 1 to 13:

FIG. 1 shows turnover values which have been obtained between January and December of the year 2012;

FIG. 2 shows another example for a table of numbers which are displayed according to the invention;

FIG. 3 shows an example which corresponds to that of FIG. 2, however, with the difference that all numbers are displayed with the same color depth;

FIG. 4 shows an example of a table in which all numbers are scaled with a linear function;

FIG. 5 shows an example which corresponds to that of FIG. 4 with the difference that the numbers are centered in horizontal and vertical directions;

FIG. 6 shows the table of FIG. 4 with the difference that the height of the lines of the table is optimized and adapted to the largest size of a number in each of the lines;

FIG. 7 shows the table of FIG. 4 with the difference that the width of the lines of the table is optimized and adapted to the largest size of a number in each of the columns;

FIG. 8 is a combination of the optimization of FIGS. 6 and 7, so that the height and the width of the lines of the table are optimized and adapted to the largest size of a number in each of the lines and columns;

FIG. 10 shows the table of FIG. 9 with the difference that the height of the lines of the table is optimized and adapted to the largest size of a number in each of the lines;

FIG. 12 is a combination of the optimization of FIGS. 10 and 11, so that the height and the width of the lines of the table are optimized and adapted to the largest size of a number in each of the lines and columns; and FIG. 13 shows the recalculation of the size of number if new numbers are added by the user or by the system itself.

DESCRIPTION OF THE PREFERRED EMBODIMENTS

Figure 9:
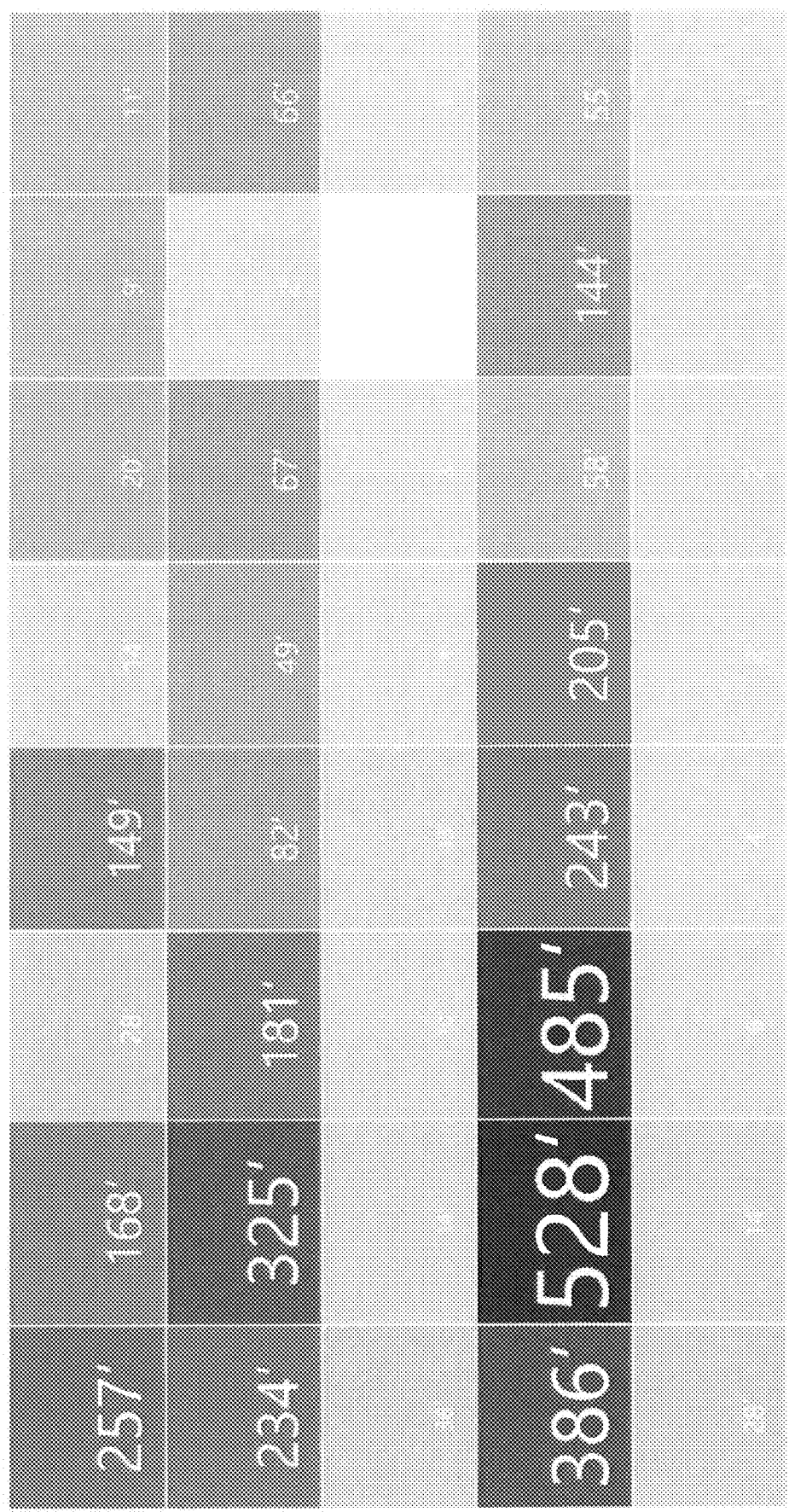
FIG. 9 is an example of a table in which all numbers are displayed in the same color, however, the background color depth of each element of the table in which a number is displayed differs depending on the value of the number in the respective element.

The table shown in FIG. 1 contains turnover values which have been obtained between January and December of the year 2012 for different chairs which are specified in the first column of the table.

The chairs are categorized in three different editions, wherein the special edition is further separated in swivel chairs and visitor chairs. The swivel chairs are further sub classified in subcategories "Nova", "Presa" an "Ergo".

As shown in the table the turnover values are displayed in different sizes and with a differing color depth, however with the same color. The largest value is 16' and the smallest value is 237. According to the present invention the largest value 16' is displayed with the largest size, whereas the smallest value is displayed with the smallest size.

In addition to this, the largest value 16' is displayed with the highest degree of color depth, i.e. is comparatively dark, whereas the smallest value 237 is displayed with the smallest degree of color depth, i.e. is comparatively bright.

All other numbers are displayed with a size and color depth which is a function of the value of the number, i.e. the larger the value is the larger is the size and the color depth of the displayed number.

As shown in FIG. 1 the present invention gives to the user a perfect and quickly comprehendible overview over the value of the displayed numbers and accordingly of their relevance in terms of their values and obviates a long-lasting search for large and small values, for trends etc.

FIG. 2 shows another example for a table of numbers which are displayed according to the invention.

P1-P8 may stand for months of a year, and K1-K5 may stand for different products.

All numbers are scaled with a linear function from 12 pt for the smallest value to 50 pt for the largest value. The color depth ranges from 30% for the smallest value to 100% for the largest value. All numbers are centered in horizontal and vertical direction.

FIG. 3 shows an example which corresponds to that of FIG. 2, however, with the difference that all numbers are displayed with the same color depth.

In FIG. 4 an example of a table is shown in which all numbers are scaled with a linear function from 12 pt for the smallest value to 50 pt for the largest value. The color depth ranges from 30% for the smallest value to 100% for the largest value. All numbers are centered in horizontal direction but have the same base line in vertical direction. Legibility is better than in case that the numbers are centered in vertical direction as well.

FIG. 5 shows an example which corresponds to that of FIG. 4 with the difference that the numbers are centered in horizontal and vertical direction.

Figure 6:
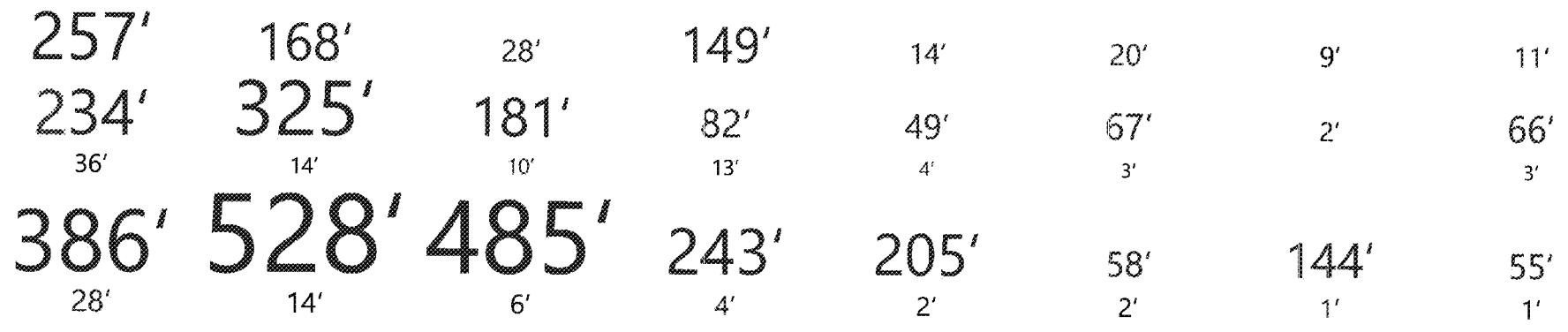

FIG. 6 shows the table of FIG. 4 with the difference that the height of the lines of the table is optimized and adapted to the largest size of a number in each of the lines.

FIG. 7 shows the table of FIG. 4 with the difference that the width of the lines of the table is optimized and adapted to the largest size of a number in each of the columns.

FIG. 8 is a combination of the optimization of FIGS. 6 and 7. Accordingly, in FIG. 8 the height and the width of the lines of the table are optimized and adapted to the largest size of a number in each of the lines and columns.

FIG. 9 is an example of a table in which all numbers are displayed in the same (white) color, however, the background color depth of each element of the table in which a number is displayed is differing depending on the value of the number in the respective element.

In FIG. 9 in addition all numbers are scaled with a linear function from 12 pt for the smallest value to 50 pt for the largest value. The color depth of the background ranges from 20% for the smallest value to 100% for the largest value. The background color is identical for all elements of the table, in this case blue RGB 0 45 113.

Figure 10:
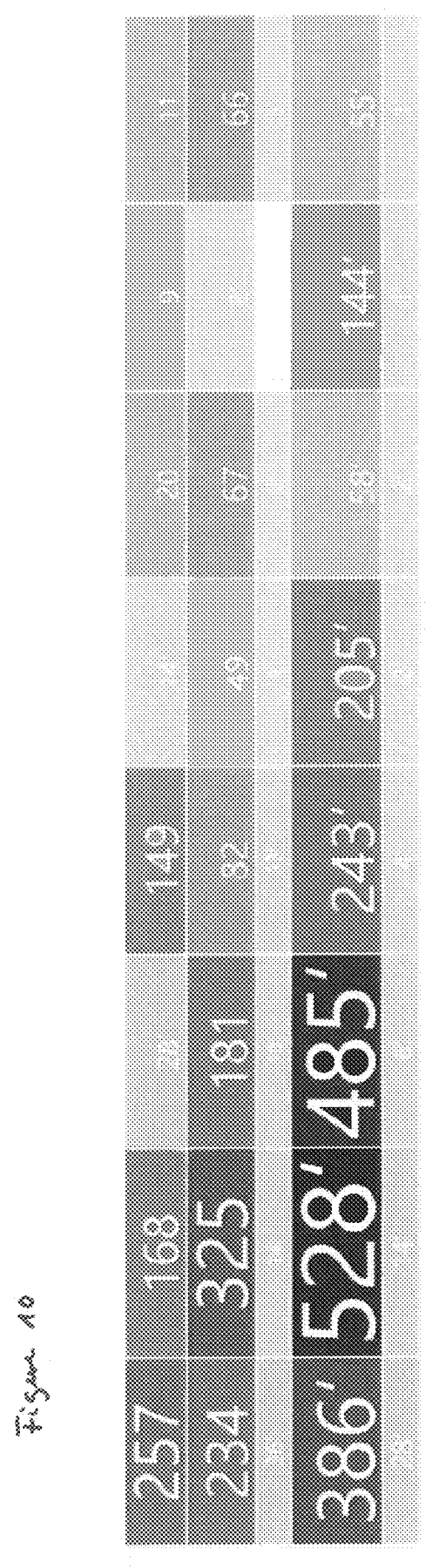

FIG. 10 shows the table of FIG. 9 with the difference that the height of the lines of the table is optimized and adapted to the largest size of a number in each of the lines.

Figure 11:
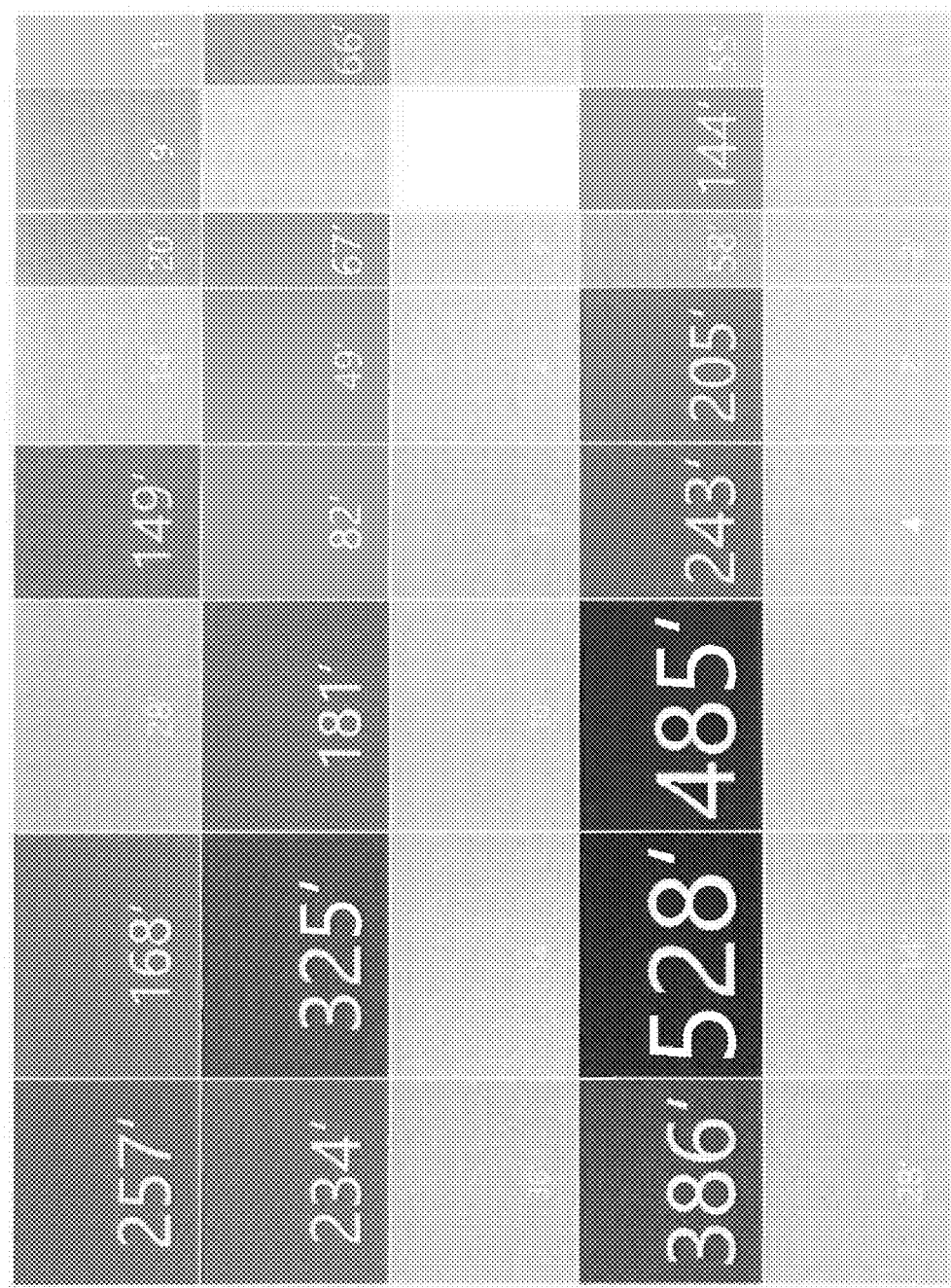
FIG. 11 shows the table of FIG. 9 with the difference that the width of the lines of the table is optimized and adapted to the largest size of a number in each of the columns.

FIG. 11 shows the table of FIG. 9 with the difference that the width of the lines of the table is optimized and adapted to the largest size of a number in each of the columns.

Figure 12:
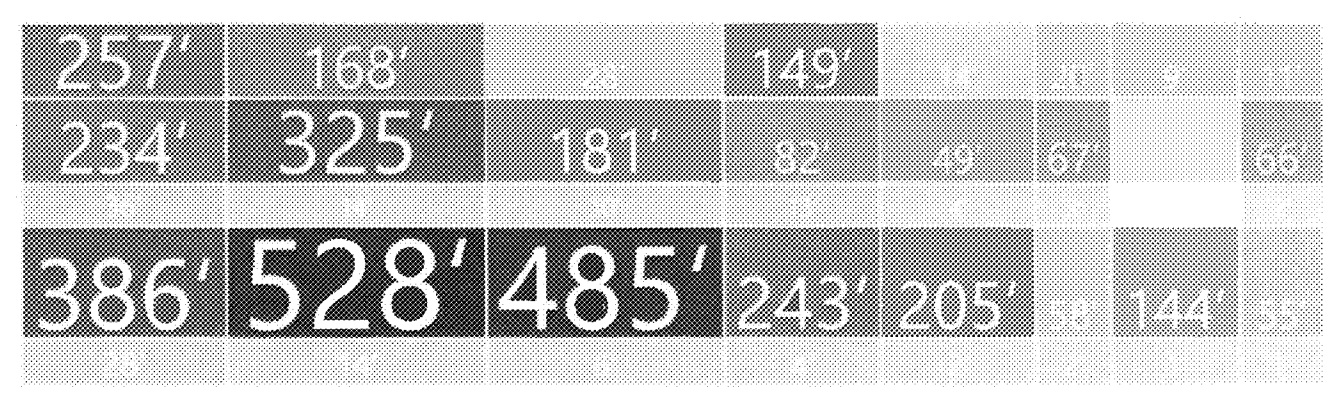

FIG. 12 is a combination of the optimization of FIGS. 10 and 11. Accordingly, in FIG. 12 the height and the width of the lines of the table are optimized and adapted to the largest size of a number in each of the lines and columns.

FIG. 13 shows the recalculation of the size of number if new numbers are added by the user or by the system itself.

In the first line the numbers 2, 4 and 6 are displayed. Their size is calculated as mentioned above in accordance with the invention.

In the second line the number 7 is added; in this case the size of the numbers which have been displayed previously, i.e. 2, 4, 6 remains unchanged. The size of the added number 7 may be calculated on a linear basis based on the displayed numbers 2, 4, 6.

In the fourth line, the user added the number 1. In that case, the system recognizes that this number is the smallest number and assigns the smallest size, such as 10 pt to this number. The next larger number, which is 2 in this example is displayed in a larger scale which may be calculated on a linear basis starting from the value 1 and its size 10 pt.

The last line of FIG. 13 shows the situation after the number 300 has been added. In that case, the largest size, such as 40 pt is assigned to this number and all other numbers except the smallest number 1 which maintains the smallest size of 10 pt are adapted, i.e. reduced in their size. However, it is also possible and covered by the invention that the number 300 is not assigned the largest possible size and that the range of sizes is iteratively increased with an increasing amount of numbers.

The invention claimed is:

1. A method for displaying at least two numbers on a display system, each number having a value, the method comprising:
   determining, by a processor of the system, a size of each number dependent on said value;
   displaying, by a display of the system, each number in the determined size;
   determining, by the processor, the smallest value and the largest value of the at least two numbers; and
   determining, by the processor, whether to maintain sizes of the at least two numbers or recalculate the sizes of the at least two numbers based on a value of a further number inputted,
   wherein as the value of each number increases, each size of the number increases,
   wherein determining whether to maintain sizes of the at least two numbers or recalculate the sizes of the at least two numbers based on a value of a further number inputted comprises:
   maintaining the sizes of the at least two numbers when the value of the further number is larger than the largest value; and
   recalculating the sizes of the at least two numbers when the value of the further number is smaller than the smallest value.

2. A method for displaying at least two numbers on a display system, each number having a value, the method comprising:
   determining, by a processor of the system, a size of each number dependent on said value;
   displaying, by a display of the system, each number in the determined size;
   determining, by the processor, the smallest value and the largest value of the at least two numbers; and
   maintaining the sizes of the at least two numbers when a value of a further number inputted is larger than the largest value.

* * * * *